United States Patent Office 3,070,422
Patented Dec. 25, 1962

3,070,422
NEW CHROMIUM-TUNGSTEN OXIDE AND PREPARATION
Gerhard Bayer, Zurich, Switzerland, assignor to Owens-Illinois Glass Company, a corporation of Ohio
No Drawing. Filed Aug. 30, 1960, Ser. No. 52,778
5 Claims. (Cl. 23—51)

This invention relates to a new chromium-tungsten oxide, and to methods for its preparation.

Rutile-type compounds can be classified into three groups: $A^{4+}O_2$, $A^{3+}B^{5+}O_4$, $A^{2+}B_2^{5+}O_6$. The prototype $A^{4+}O_2$ compound is rutile, $TiO_2$. $A^{3+}B^{5+}O_4$ compounds have the same unit cell and are typified by statistical distribution of the cations in the lattice. Examples include tantalates, such as $CrTaO_4$, and antimonates, such as $AlSbO_4$. $A^{2+}B_2^{5+}O_6$ compounds have the trirutile structure as reported by Goldschmidt et al., "Geochemische Verteilungsgesetze der Elemente: VI, Uber die Kristallstrukturen vom Rutiltypus" (Geochemical Distribution Law of the Elements: VI, Crystal Structure of Rutile Type with Remarks on Geochemistry of the Bivalent and Quadrivalent Elements), Skrifter Norske Videnskaps-Akad. Oslo, Mat.-Nat. Kl., No. 1, 21 pp. (1926); p. 18.

The rutile and trirutile structures are closely related. The unit cell of the trirutile structure corresponds to three unit cells of the monorutile structure, except that the Ti positions are occupied in a regular way by $A^{2+}$ and $B^{5+}$ ions. Both belong to the space group P4/mm. Prior to my invention only compounds of the general type $A^{2+}B_2^{5+}O_6$ have been found to have the trirutile structure (Anders Bystrom, Brita Hok, and Brian Mason, "Crystal Structure of Zinc Metantimonate and Similar Compounds," Arkiv. Kemi, Mineral. Geol., 15B (4) 1–8 (1941); Brian Mason and C. J. Vitaliano, "Bystromite, Magnesium Antimonate, a New Mineral," Am. Mineralogist, 37, 53–57 (1952)).

An object of the present invention is to provide a new type trirutile compound, namely, a chromium-tungsten oxide of the formula $Cr_2WO_6$. Another object of the invention is to provide methods for the preparation of such new compound. Other objects of the invention will become apparent from a study of the accompanying disclosure.

According to the present invention, I have now discovered a new type of trirutile compound $Cr_2WO_6$, and methods for its preparation. In contrast to previous trirutile compounds, my present compound has the general formula $A_2BO_6$, where A is the three-valent ion, $Cr^{3+}$, and B is the six-valent ion, $W^{6+}$.

The general formula for this compound is in contrast to the general formula $AB_2O_6$ for a normal trirutile compound. The lattice positions of A and B ions are therefore interchanged and the structure of $Cr_2WO_6$ can be interpreted as an "inverse trirutile structure." $Cr_2WO_6$ can be regarded as a superlattice of rutile, with regular distribution of the $Cr^{3+}$ and $W^{6+}$ ions in the tripled rutile cell. The density of the $Cr_2WO_6$ is much lower than that of a normal trirutile compound containing cations of similar atomic weight, e.g., $FeTa_2O_6$. This is due to the reverse arrangement of the ions in the unit cell, so that the number is four A ions and two B ions for $Cr_2WO_6$, as compared with two A ions and four B ions for normal trirutile compounds.

According to the invention, the new compound is prepared by intimately admixing powdered $Cr_2O_3$ and $WO_3$, compacting the powdered mixture into a cohesive mass, and thereafter heat-treating the materials, usually in a non-reducing atmosphere at a temperature from about 800 to about 1100° C. An oxidizing atmosphere is usually employed, such as air. Temperatures are preferably in the range from 850 to 1000° C. Times can be from 2 to 30 hours, usually from 5 to 20 hours, although shorter or longer times than these ranges can be used. If too short a time is used, the yield is merely lowered. Too long a time is merely unnecessary. The temperature should be at least 800° C., but can be somewhat above 1100° C. without encountering excessive decomposition of the $Cr_2WO_6$ in the time necessary for substantial completion of the reaction. Of course, an excessive time of heating, at elevated temperatures of 1100° C. or higher can also cause undesirable decomposition.

In preparing the compound, while it is desirable that equimolar ratios of $Cr_2O_3$ and $WO_3$ be employed in order to obtain a product substantially free from contamination of one or the other of the starting materials, any ratio of the starting materials can be employed. Thus, reactions were effected, as set forth hereinbefore, using molar ratios of $Cr_2O_3$ to $WO_3$ of 1 to 3 and 3 to 1. In the first case, the product, as shown by X-ray patterns, was $Cr_2WO_6$ + $WO_3$, and, in the second instance, the product was $Cr_2WO_6$ + $Cr_2O_3$, without any change in the lattice constants or formation of any other compound.

In a series of other specific examples of the invention, carried out as outlined hereinbefore, using in each case an equimolar ratio of $Cr_2O_3$ and $WO_3$, each powdered to less than 10 microns, the compacted samples were heated, respectively, at 600, 750, 800, 850, 900, 1000, and 1100° C. for 20 hours in air. X-ray patterns of the respective products showed that the formation of $Cr_2WO_6$ started at 800 to 850° C. and was complete at about 950° C. Below 800° C. the X-ray pattern of a mixture of $Cr_2O_3$ and $WO_3$ was obtained.

On the pure $Cr_2WO_6$ compound obtained in one of the foregoing runs, X-ray powder diffraction data were obtained, and these are shown in Table I, as compared with similar data for rutile and bystromite. Table II shows for these compounds the ionic radii, axial ratios and densities.

*Table I.—Lattice Spacings and Intensities for Rutile- and Trirutile-Type Compounds (X-Ray Powder Diffraction Data)*

| Rutile | | | $Cr_2WO_6$ | | | Bystromites, $MgSb_2O_6$ | | |
|---|---|---|---|---|---|---|---|---|
| d | $I/I_0$ | hkl | d | $I/I_0$ | hkl | d | $I/I_0$ | hkl |
| | | | 4.43 | 51 | 002 | 4.63 | 40 | 002 |
| | | | 4.05 | 49 | 101 | 4.19 | 70 | 101 |
| 3.245 | 100 | 110 | 3.22 | 100 | 110 | 3.32 | 100 | 110 |
| | | | 2.614 | 19 | 112 | 2.69 | 30 | 112 |
| 2.489 | 41 | 101 | 2.481 | 90 | 103 | 2.57 | 90 | 103 |
| 2.297 | 7 | 200 | 2.285 | 16 | 200 | 2.34 | 50 | 200 |
| | | | 2.217 | 6 | 004 | | | |
| 2.188 | 22 | 111 | 2.181 | 9 | 113 | 2.25 | 20 | 113 |
| 2.054 | 9 | 210 | 2.036 | 7 | 202 | 2.08 | 30 | 202 |
| | | | 1.994 | 14 | 211 | 2.04 | 30 | 211 |
| | | | 1.827 | 8 | 114 | | | |
| 1.687 | 50 | 211 | 1.631 | 61 | 213 | 1.73 | 90 | 213 |
| | | | 1.65 | 6 | 105 | | | |
| 1.624 | 16 | 220 | 1.615 | 16 | 220 | 1.65 | 40 | 220 |
| | | | 1.58 | 5 | 204 | | | |
| | | | 1.515 | 3 | 222 | | | |
| | | | 1.50 | 3 | 301 | | | |
| 1.48 | 8 | 002 | 1.476 | 13 | 006 | 1.54 | 20 | 006 |
| 1.453 | 6 | 310 | 1.445 | 11 | 310 | 1.48 | 40 | 310 |
| | | | 1.375 | 4 | 312 | | | |
| 1.36 | 16 | 301 | 1.352 | 15 | 303 | 1.39 | 40 | 303 |
| 1.347 | 7 | 112 | 1.344 | 16 | 116 | | | (116) |
| | | | 1.307 | 3 | 224 | | | |
| | | | 1.256 | 4 | 321 | | | |
| 1.243 | 3 | 202 | 1.241 | 7 | 206 | 1.28 | 10 | 206 |
| | | | 1.221 | 4 | 314 | | | |
| 1.17 | 4 | 321 | 1.166 | 9 | 323 | 1.19 | 30 | 323 |
| | | | 1.152 | 10 | 305 | | | |
| 1.148 | 4 | 400 | 1.143 | 5 | 400 | | | |

*Table II.—Ionic Radii, Axial Ratios, and Densities*

| | rA (a.u.) | rAB (a.u.) | $a_o$ (a.u.) | $c_o$ (a.u.) | $c_o/3$ (a.u.) | $c_o/a_o$ | $c_o/3/a_o$ | p (exp.) (gm./cc.) |
|---|---|---|---|---|---|---|---|---|
| $TiO_2$ | 0.68 | | 4.58 | 2.95 | | 0.64 | | 4.24 |
| $Cr_2WO_6$ | | 0.635 | 4.57 | 8.86 | 2.95 | | 0.647 | 6.68 |
| $MgSb_2O_6$ | | 0.63 | 4.63 | 9.23 | 3.07 | | 0.664 | 5.51 |

The $Cr_2WO_6$ is relatively stable. As determined by tests, it begins to lose $WO_3$ after firing at 1100° C. for more than 100 hours, as shown by very weak reflections of $Cr_2O_3$. Its color is a very intense purple-brown; it is insoluble in water. Its experimentally determined density is shown in Table II.

The compound was determined to have very interesting electrical properties. Its dielectric constant is about 16.4, its dissipation factor (tan δ) about 0.75, power factor about 0.60, loss angle about 36.8°, and its resistivity about $1.63 \times 10^9$ ohm cm.

The new compound of the invention has varied uses. For instance, it is a useful refractory in furnace construction in furnaces used to make ferrites by solid-state reactions carried out at temperatures below 900° C.

The new compound is also useful as a pigment or filler for paints in normal paint-making processes. For instance, the following paint formula can be used.

| Ingredient: | Lbs. |
|---|---|
| $Cr_2WO_6$ | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

The product is particularly useful because of its unusual electrical properties. It can be described as a lossy dielectric. It can be used in an R.C. (resistance-capacitance) circuit where it continuously acts as a leaky capacitance.

In addition to the foregoing practical uses, the new chromium-tungsten oxide compound of the invention is useful in expanding the fund of knowledge in the crystalline and refractory fields. Study of this compound of unusual structure will be helpful to other scientific workers in the field in suggesting avenues of approach to prepare similar new compounds of a trirutile and inverse trirutile structure.

As will be evident to those skilled in the art, various modifications of this invention can be made or followed in the light of the foregoing disclosure and discussion without departing from the spirit and scope of the disclosure or from the scope of the claims.

I claim:

1. A crystalline oxide of the formula $Cr_2WO_6$ having a rutile crystalline structure.

2. A method of making a crystalline oxide of the formula $Cr_2WO_6$ having a rutile crystalline structure by a solid-state reaction which comprises intimately admixing powders of $Cr_2O_3$ and $WO_3$, compacting the resulting admixture into a cohesive mass, and heating said mass at a temperature of at least 800° C. up to the temperature at which $Cr_2WO_6$ begins to decompose at an undesirable rate.

3. A method of claim 2 wherein the temperature is from 800 to 1100° C.

4. A method of claim 2 wherein the temperature is from 850 to 1000° C.

5. A method of claim 2 wherein a substantially equimolar ratio of $Cr_2O_3$ and $WO_3$ is employed.

References Cited in the file of this patent

UNITED STATES PATENTS

| 2,721,117 | Schoenlaub | Oct. 18, 1955 |
| 2,735,748 | Wainer | Feb. 21, 1956 |
| 2,893,832 | Loung | July 7, 1959 |
| 2,962,346 | Sindlinger et al. | Nov. 29, 1960 |

OTHER REFERENCES

Hoffman: Lexicon der Anorganischen Verbindungen, Verlag Von Johann Ambrosium Barth, Leipzig, 1912–1914, Band II, A1 to X, No. 56–81, page 726.